United States Patent
Leshchinsky et al.

(10) Patent No.: US 6,602,316 B1
(45) Date of Patent: Aug. 5, 2003

(54) BRIQUETTE FOR LOWERING THE VISCOSITY OF METALLURGICAL SLAG AND PROCESS FOR ITS PRODUCTION

(75) Inventors: Volf M. Leshchinsky, Herzliya (IL); Viktor I. Boldenkov, Sverdlovsk (UA); Aleksandr N. Stepanenko, Aleksandrovka (UA); Ljubov A. Nikitina, Lugansk (UA); Karel Knap, Dobris (CZ)

(73) Assignee: Impexmetal Dobris S.R.O., Dobris (CZ)

( * ) Notice: Subject to any disclaimer, the term of this patent is extended or adjusted under 35 U.S.C. 154(b) by 0 days.

(21) Appl. No.: 10/069,042

(22) PCT Filed: Aug. 14, 2000

(86) PCT No.: PCT/CZ00/00057
§ 371 (c)(1),
(2), (4) Date: May 16, 2002

(87) PCT Pub. No.: WO01/14605
PCT Pub. Date: Mar. 1, 2001

(30) Foreign Application Priority Data

Aug. 23, 1999 (CZ) .......................................... PV 3007-99
Aug. 10, 2000 (CZ) .......................................... PV 2951-00

(51) Int. Cl.[7] ............................................. C22B 1/244
(52) U.S. Cl. .............................. 75/313; 75/772; 75/323
(58) Field of Search ........................... 75/313, 772, 323

(56) References Cited

U.S. PATENT DOCUMENTS 3,893,846 A * 7/1975 Takashima .................... 75/233
4,010,023 A * 3/1977 Bowden ....................... 75/687
5,728,209 A * 3/1998 Bury et al. .................. 106/819

FOREIGN PATENT DOCUMENTS

EP 0034639 9/1981
WO WO 9928264 A1 * 6/1999 ........... C04B/22/06

OTHER PUBLICATIONS

Abstract of JP 02270920 A by Uno et al, published Nov. 6, 1990.*
Derwent Acc No. of RU 2000344 C by Donskoi et al, published Sep. 7, 1993.*
Patent Abstract of Japan, vol. 1995, No. 1, Feb. 28, 1995 of JP 06 299217 A, Oct. 25, 1994.

* cited by examiner

*Primary Examiner*—Roy King
*Assistant Examiner*—Andrew Wessman
(74) *Attorney, Agent, or Firm*—Dykema Gossett PLLC

(57) ABSTRACT

Briquettes for the liquefaction of metallurgical slag are formed from a mixture containing, by weight, 85–98% slag from secondary aluminium processing, 1 to 8% polyvinyl acetate dispersion as the polymeric bonding agent and the remainder water, the briquettes containing water in the form of residue humidity at a quantity of maximally 1.5%, ideally no more than 0.5%, in relation to the overall weight of the briquettes, and the briquettes have a specific weight of 1,500–5,000 kg.m$^{-3}$ and a compression strength of at least 20 MPa. Ideally, the mixture contains 90–92% slag from secondary aluminium processing, 1 to 3% polyvinyl acetate dispersion and the remainder water. The mixture may also contain 0.5–2% unsaturated acid, selected from the group containing oleic acid and/or palmitic acid and/or stearic acid, as a hydrophobic ingredient. The ideal shape of the briquettes is cylindrical.

8 Claims, 1 Drawing Sheet

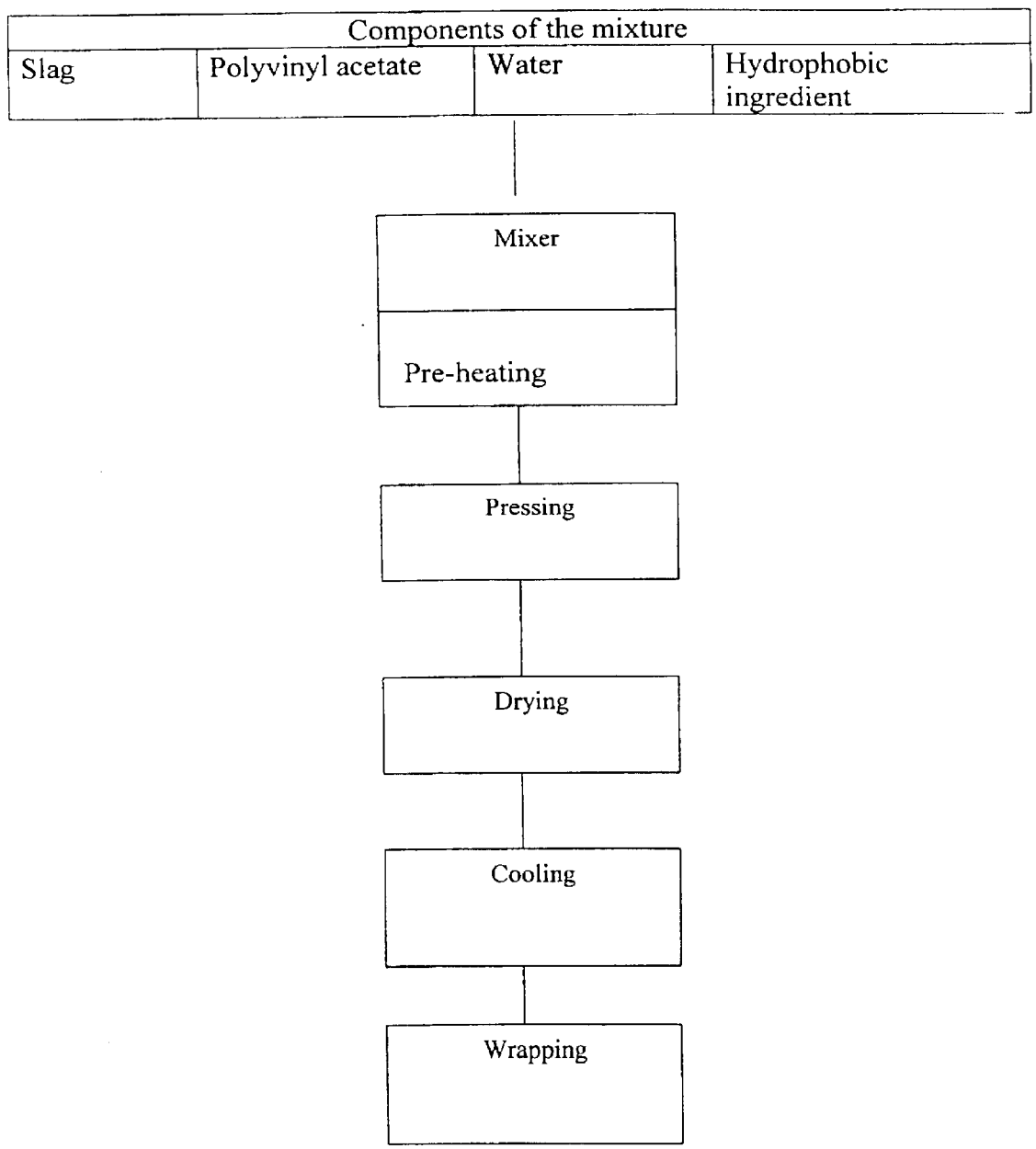

BRIQUETTE FOR LOWERING THE VISCOSITY OF METALLURGICAL SLAG AND PROCESS FOR ITS PRODUCTION

TECHNICAL FIELD

The invention concerns briquettes for the liquefaction of metallurgical slag, composed of a mixture consisting of slag from secondary aluminium processing as the basic ingredient, plus a polymeric bonding agent and water. The invention also concerns a method for production of such briquettes.

BACKGROUND ART

During the manufacture of aluminium, various kinds of slag are created containing different quantities of accompanying elements and compounds. At the present time, slag from secondary aluminium processing constitutes a waste product in the manufacture of aluminium and occupies a large amount of utility space in the form of heaps. In addition, when this slag is stored in heaps, it decomposes under the influence of atmospheric conditions and releases foul-smelling and harmful ammonia, causing significant deterioration of the environment. During the process of dumping, this slag gradually acquires a fine grainy consistency, thus generating a quantity of mineral and aluminate dust.

Slag from aluminium production is further processed by crushing and washing out, so that the residue aluminium may be obtained. The remaining part, which consists of a mixture of oxides, chlorides, fluorides and metal particles, particularly on a base of Al, Na, K and Si, is mostly dumped out or is very difficult to use.

Much of the technology that has already been introduced is applied to the use of the metallic parts of scum, or these scums and slags are washed out with water after granulometric treatment by crushing and milling. The first method generates a segment of waste that cannot be processed, i.e., the already mentioned mixture of metal particles and oxides.

In other cases where these waste products are extractible etc. after milling, a large quantity of gases are produced, including ammonia, acetylene, methane, sometimes arsines, phosphines, in addition to salt solutions and sludge. A drawback of these manufacturing processes is the creation of dangerous gases, salt solutions and sludge, whose liquidation requires large quantities of energy or complicated apparatus.

For example, in the Czech published patent application PV 830-95, a method is described for processing the dust fractions of aluminium scum; according to this method, the scum and aluminium waste are leached, without any kind of treatment, and dissolved in an air-excluding environment in a leaching solution containing chloride ions; in this environment, the carbides and nitrides decompose and the aluminium reacts. The resultant ammoniac, hydrogen, methane, appropriately the phosphines, arsines and other products are burned at a temperature of 800–1,000° C. The remaining pulp is filtered off. A mixture of chloride salts is crystallised out from the water solution under heat. The filter cake is dried and without the presence of carbides, carbonitrides, metal aluminium etc. is granulated into pellets or briquettes.

The disadvantage of this method is the complicated machinery, manufactured mainly from rust-free material or material otherwise protected against corrosion, with problems in the capture of the released gases for hygienic and environmental reasons. This relatively complicated method is demanding in terms of energy consumption and is relatively costly in terms of investment and manufacture.

A certain improvement is seen in the complex agent described in the Czech published patent application PV 2914-90, which is designed for the liquefaction of slag with desulphurising effects. Here, in the fining process of steelmaking, cryolite deposits created as waste substances during the electrolytic manufacture of primary aluminium are used as diluting agents for slag. The complex agent may be used in crushed state without further treatment or the addition of other components. The invention does not solve the problem of using the waste from the manufacture of secondary aluminium, in which it is usually necessary to secure the consolidation of the powder and fine-grain components of the slag from this manufacturing process.

In metallurgy, during the melting of iron and steel to reduce viscosity and facilitate the removal of slag during melting, fluorite, a low-profile and relatively expensive substance, is used as one of the components for liquefying the slag.

Slag from secondary aluminium processing, which up to now has been treated as manufactural waste, could be a valuable substitute for fluorite. Slag from secondary aluminium processing cannot be used in ferrous metallurgy as a liquefying agent in its original loose or powder form, as handling is inconvenient and makes the work-place very dusty in a manner contrary to industrial safety regulations.

Therefore, when slag from secondary aluminium processing is used in ferrous and steel metallurgy, it is suitable to process it into briquette form, enabling the ecological improvement of the environment and the work-place.

The manufacture of briquettes from slag makes use of various types of bonding agents, such as water glass, lime milk, molasses and other types of suitable adhesive substances. These substances, however, do not ensure a sufficient degree of strength in the briquettes.

Austrian patent AT 390 965 describes technology for the processing of aluminium scum, i.e. coarse-grain dross which are crushed. Metal aluminium is thus obtained, and the solid residue is further It processed into briquettes for the liquefaction of metallurgical slag. As the bonding agent, complex polymers with large amounts of radicals are used, such as the methyl group $CH_3$, the ammonium group $NH_4$, the phenyl groups, the cyanide groups CN and metal traces. These polymers are manufactured by means of complicated technology. In addition, at high temperatures they decompose and release poisonous substances such as phenol and hydrogen cyanide. Very high temperatures, ranging from 1,800 to 2,800° F. (900–1,540° C.) are used to polymerise the mixtures. Heating to such temperatures makes the technical process of polymerisation expensive and complicated. The granulation technology mentioned above is not suitable for slag from secondary aluminium processing, as its large reactive capacity causes a decomposing reaction to take place in the granules, which in turn causes the granules to lose their strength and resistance to decomposition. The highest strength value for the dry granules thus obtained is 21.9 psi, corresponding to 0.16 MPa, which is not sufficient for briquettes from aluminium slag. The highest strength value is obtained by the addition of clay to the mixture. But the addition of clay for the purpose of binding the particles of aluminium slag also seems to be unsuitable, owing to the considerable increase in the quantity of $SiO_2$ in the mixture and to the high firing temperature of 2,800° F. (1,540° C).

Reducing the quantity of clay leads to rapid reduction in the strength of the briquettes down to 0.016–0.02 MPa. For these reasons it is clear that the composition of bonding agent and manufacture of granules is not very suitable for the processing of slag from secondary aluminium processing into briquettes.

The purpose of this technical discovery is to obtain a cheap liquefying agent from slag from secondary aluminium processing that has identical properties to fluorite in the liquefaction of metallurgical slag, in such a manner or with such equipment as to minimise the disadvantages outlined above.

SUMMARY OF THE INVENTION

This aim will be achieved with briquettes for the liquefaction of metallurgical slag composed of a mixture of slag from secondary aluminium processing, as the basic component, a polymeric bonding agent and water, in accordance with this invention. The substance of this invention lies in the fact that the mixture contains, by weight, 85–98% by weight slag from secondary aluminium processing, 1–8% by weight polyvinyl acetate dispersion as the polymeric bonding agent, and the remainder water; and that the briquette contains water as residue humidity at a quantity of up to 1.5% by weight, ideally to 0.5% by weight, as related to the total weight of the briquette, where the briquette has a specific weight ranging from 1,500–5,000 kg.m$^{-3}$ and a strength under pressure of at least 20 MPa.

The ideal content of the mixture is, by weight 90–92% slag from secondary aluminium processing, 1–3% polyvinyl acetate dispersion and the remainder water.

It is also beneficial when the mixture also contains 0.5–2% by weight unsaturated acid selected from the group that includes oleic acid and/or palmitic acid and/or stearic acid as a hydrophobic ingredient.

In its advantageous version, the briquette has a cylindrical shape.

The briquette according to this invention is obtained by the method of manufacture according to this invention, the essence of which is that the various components of the mixture, i.e. slag from secondary aluminium processing, polyvinyl acetate dispersion as bonding agent, water, with the possible addition of a hydrophobic ingredient, are blended into a homogenous state in a mixer in a time of 10–60 seconds. The homogenous mixture thus obtained is then pressed at a specific press power of 110 to 130 MPa. The briquette is then dried at a temperature of 120 to 200° C. for 30–60 minutes, depending on the weight of the briquette, until residue water in the briquette reaches a value of 1.5% at maximum. After drying, the hot briquette is cooled. The cooled briquette is wrapped for protection against humidification until further use or processing.

For the blending of the components into a homogenous state in the mixer, it is useful if the mixture is preheated to a temperature between 25 and 99° C.

After drying and before wrapping, it is essential to cool the hot briquette to a temperature between 30 and 50° C.

The main advantage of this invention is that slag can be used as a liquefying agent in metallurgy, e.g. in the manufacture of iron and steel to lower the viscosity of the melt, which considerably reduces costs. Thus a waste product generated by the manufacture of aluminium is utilised, as this waste product stored in heaps decomposes under the influence of various climactic conditions, simultaneously giving off foul-smelling or harmful substances such as ammonia, methane, hydrogen and phosphines. This represents another benefit of the invention, namely the improvement of the environment, including the working environment, and the release of utility areas previously used for slag heaps. Thus it is possible to process the portion of scum that is difficult to process into an environmentally friendly product.

In order to obtain briquettes with sufficient strength under a pressure of at least 20 MPa, it is proposed that the composition of briquettes include a polymeric bonding agent, namely polyvinyl acetate. Briquettes for the liquefaction of metallurgical slag may have varying degrees of strength and stability during storage, depending on the choice of polymeric substance and its composition. Briquettes of cylindrical shape weighing 50 to 250 g have the greatest strength. To guarantee equal distribution of the bonding particles of the polymeric substance between the particles of slag, the briquettes contain water.

According to its physical properties, slag is a consolidated substance. The specific weight of slag before processing into briquette form is approx. 1,100 kg.m$^{-3}$. In order to obtain briquettes of sufficient strength, it is essential that their specific weight amount to between 1,500 and 5,000 kg.m$^{-3}$.

The proposed invention uses polyvinyl acetate, a very simple polymer that is cheap to manufacture:

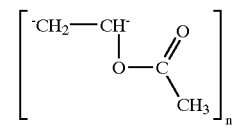

The polymer has one radical, namely the acetate group OCOCH$_3$.

When this polymer decomposes, it releases substances that are not harmful to living organisms. These substances include water, carbon dioxide and acetic acid. In essence it is a polymeric, coarsely disperse, non-plasticized, viscous liquid, slightly yellow white in colour, with particles 1–3 micrometers in sized, devoid of granules or alien mechanical intrusions. The weight proportion of dry residue is at least 51%. The weight proportion of remanent monomer is up to 0.5%. The usual viscosity, according to the standardised measuring-vessel measurement, is 11–40, expressed as a Saybolt number. Adhesive power is at least 450 N/.m$^{-1}$.

So that the briquettes according to this invention may be used for the liquefaction of metallurgical slag, they must have not only sufficient strength and stability in storage, but also a minimal cost. If the quantity of the polymeric ingredient in the composition of the briquettes is increased, the briquettes' strength and resistance t decomposition is increased, but the cost of manufacture rises sharply to 10–20 times the amount. For this reason, to preserve a minimal cost of manufacture whilst obtaining the necessary strength and resistance of the briquettes, the polymeric substance may be partly replaced by hydrophobic ingredients. The addition of at least one hydrophobic ingredient to the mixture for briquette manufacture, in a quantity of 0.5–2% by weight, acts in a water-resistant way and significantly reduces the absorption capacity of the briquette whilst considerably lengthening the storage period. For the hydrophobic ingredient, unsaturated acids such as palmitic acid, stearic acid and oleic acid are used. The acid used most often is oleic acid, described by the chemical formula C$_{17}$ H$_{33}$ COOH, which exists in two crystalline modifications, alpha and beta, with melting temperatures of 13.4 and 16.3° C. respectively. At room temperature this acid has a specific weight of 0.089 g.cm$^{-3}$. Both of these acids may be used as pure chemicals or in mixtures of 0 to 100% in mutual combination. These acids reduce the hydroscopic properties of the mixture and the subsequent absorption of atmospheric humidity. They may also be used as lubricants in pressing machines.

For an equal distribution of the bonding particles of the polymeric substances and the hydrophobic ingredient among the particles of slag, as well as for the reduction of the internal and external abrasive forces arising as a consequence of pressing, water is added to the briquettes. The water may be either service water or tap water.

So that the briquettes from secondary aluminium processing may be used for the liquefaction of metallurgical slag, they must have sufficient strength and resistance to decomposition. The manufacture of briquettes from secondary aluminium processing using ordinary humidifying technology is not feasible, as the briquettes thus obtained decompose in 20–40 minutes while drying in the air. This occurs because some of the components of the slag, e.g. the aluminium nitrides $Al_xN_y$ and Al aluminium, enter into a chemical reaction with the water, generating, heat and gases such as ammonia and hydrogen. The gases thus released disrupt the bonding between the particles and the briquettes disintegrate.

The components of the briquette mixture are mixed into a homogenous state in a mixer in a time of 10–60 seconds. The mixing time of 10 seconds is the minimum time necessary for the mixture to be fully moistened, whilst 60 seconds is the maximum mixing time in order to avoid speeding up the heightened decomposition of the slag. At first, the bonding ingredients and the water are mixed in a special mixer of e.g. circular type. In this type of mixer, the polymeric dispersion is subsequently mixed with the slag from secondary aluminium processing. The mixture is deemed homogenous when the homogenised briquette mixture compresses slightly and its component ingredients do not separate.

The pressing of the briquettes is carried out at a specific press power of 110 to 130 MPa, which guarantees the compression strength of the briquettes and ensures that the bonding agent and any hydrophobic ingredient is squeezed out to the surface of the slag grains.

To dry the briquettes, a temperature of 120–200° C. is recommended, for a time of 30–60 minutes depending on the weight of the briquette, so that the water necessary for soaking the surface of the slag can be removed in order to avoid unwanted decomposition of the slag. Thus the temperatures for polymerising and drying the briquettes are sufficiently low, reducing the cost of the processing. Drying can be done in a drying apparatus of rotational type.

After drying, the hot briquettes are usually easily cooled. If this does not take place, there is a risk that they will re-absorb humidity and disintegrate. The briquettes can be artificially cooled to 30–50° C., according to the type of packaging used thereafter. Cooling may be carried out naturally or artificially in a cooling conveyer.

The cooled briquettes are wrapped up for protection against humidity by, for example, atmospheric precipitation and excess humidity, until further use or processing.

The proposed method allows part of the scums that are difficult to process to be processed into a product which is acceptable with regard to protection of the environment and which saves primary raw material resources, especially fluorite, quartz sands, aluminium oxide or bauxite.

BRIEF DESCRIPTION OF THE DRAWINGS

The invention is described below in detail in a variety of possible versions. The technological process of briquette manufacture is schematically depicted in concise form in the appended figure.

DETAILED DESCRIPTION OF EMBODIMENT EXAMPLES

EXAMPLE 1

The slag, obtained from secondary aluminium processing and destined for briquetting, has the following chemical composition converted to known substances at weight percentage:

60–65% $Al_2O_3$

8–10% $SiO_2$

5–10% $Al(OH)_3$

7–10% MgO

5–7% NaCl+KCl up to 3% $Na_3AlF_6$ up to 1.5% ZnO up to 1.5% CaO up to 1.5% $Al_xN_y$ up to 1.5% Fe up to 1.5% Cu traces up to 25% Al traces: P, As, C, Ni, V, Cr, Mo, Ti.

In mineral terms, slag is an aluminosilicate.

The module of Ma activity fluctuates around the 6.5 mark. Basicity is usually 0.17.

Slag is acidic, and decomposes of its own accord during storage. It contains hygroscopic components such as nitrides, carbides and reacting aluminium, which absorb humidity from the surroundings. Components such as aluminium nitrides $Al_xN_y$ and aluminium Al decompose on interaction with water and release a large quantity of heat and gases such as ammonia and hydrogen:

$$AlN+3H_2O=Al(OH)_3+NH_3$$

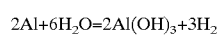

$$2Al+6H_2O=2Al(OH)_3+3H_2$$

Under the influence of the gases released, the slag decomposes into small particles sized 0.1 to 1.5 mm. These dimensions are entirely suited to the granularity requirements of the charge in briquette manufacture, and assist the operation of crushing the slag. In briquette manufacture, the slag is loaded into the mixer either directly from the slag heaps in its natural state, or from the crushing apparatus. Powder and individual larger particles measuring 4 to 6 mm are admissible as inclusions.

Before the polyvinyl acetate dispersion is added to the slag, it is preliminarily dissolved in water. The presence of water is essential for the equal distribution of the particles of polyvinyl acetate dispersion amongst the particles of slag, as well as for the reduction of the internal and external abrasive forces arising in consequence to the pressing of the slag. It is necessary to use water here only in a certain amount, as any excess water is pressed out through the edges of the pressing apparatus during pressing, thus leading to technical problems, damage to the machinery and pollution of the work-place. On the other hand, an insufficient quantity of water leads to unequal distribution of the particles of polymeric bonding agent, which has a negative effect on the properties of the briquettes manufactured. Water is actually harmful to the briquettes, and the water content in the example versions has been set at the optimum level for the particular slag. In fact, the water content covers the fluctuating composition of the slag, particularly with regard to metal aluminium nitrides, carbonitrides and any other compounds.

Briquettes for the liquefaction of metallurgical slag according to this technical method are manufactured as follows:

Firstly, the polyvinyl acetate is mixed with water in a separate mixer, and the polyvinyl acetate dispersion thus obtained is fed, in a certain quantity, into another mixer, where it is mixed carefully with the slag and hydrophobic ingredient. After mixing, the briquetting mixture thus obtained is fed into a press, where the briquettes are pressed at a specific press power of 110 to 130 MPa, ideally at 125 MPa. After pressing, the briquettes are transferred to a drying apparatus of circular type with a cooling conveyer. After cooling, the briquettes are wrapped in a material such as polyethylene.

As far as dosing is concerned, there is a dosing system with continuous cyclical operation, which is used in concrete manufacture. In the manufacture of slags mixtures, it is necessary that the dosing of individual components be precise, and thus volume dosers are suitable for this technology. The manufacture of slag mixture is accompanied by the release of aluminium powder, which has an adverse effect on the working environment, so that it is convenient to exclude the presence of a person controlling the mixing process. For this purpose, it makes sense to use automatic systems for controlling the loading, dosing and unloading of materials in cyclical dosers. Automatic weight dosers with indirect action according to the construction principle of the automatic regulation system are divided into dosers with direct and dosers with indirect effect. Direct-effect dosers have in one unit an apparatus for weighing and measuring material. Indirect-effect dosers have two separate units, one for weighing and the other for measuring. Weight dosers consist of the following basic parts: a weight dosing tank, loading apparatus, weighing apparatus for receiving the load, a weighing mechanism and control mechanism. The loading apparatus may be arranged as a valve whereby the flow of material supplied to the doser from the tank is admitted and regulated. In the manufacture of the slag mixture, a special doser for dosing slag and for the dosing of liquid may be used. Automatic dosers for liquids may be bifractional and may enable the weighing of two components: water and the polymeric ingredient. Automatic dosers for slag may be monofractional or bifractional. These types of automatic dosers may have various modifications allowing them to be used for production lines of varying degrees of performance. To ensure the operation of dosers in automatic regime there are digital indicators furnished with devices for setting the doses and for remote-controlled data transfer and automatic control.

As far as the mixing apparatus is concerned, during the process of mixing the slag with the polymer substance, as has already been said, it is essential that the quantity of water in the slag mixture is minimal, and it is necessary to make sure that the mixing of the slag with the polymeric ingredient is done homogenously. Thus a mixer which carries out the mixing process as productively as possible must ensure homogenous mixing of all the ingredients in a short period of time, must achieve high productivity and must have a mixing bowl of sufficient capacity. During the course of research, it was discovered that, out of all the types of mixer, the type that most fits these requirements is the rotational and turbulent type cyclical blender of concrete mixtures with forced mixing of components. The technical properties of these mixers fluctuate within the following margins: mixing time 10–60 seconds, performance 2.6–32 $m^3.h^{-1}$. These technical properties enable these mixers to be used for production lines of varying degrees of performance.

A slag briquetting mixture that is ready for briquetting and has the required composition is obtained with the precise dosing of individual components, i.e. slag, water and additives, prior to their feeding into the slag mixer. Inaccuracy in the dosing of individual components of the slag mixture is admissible to a degree of ±2% for water and additives, and ±3% for slag, by weight.

After mixing in the mixer, the slag mixture proceeds to the press maschine, which carries out the briquetting process.

The above-mentioned slag is, according to its physical properties, a consolidated substance. For the briquettes to acquire sufficient strength, it is necessary that their specific weight be at least 1,500 $kg.m^{-3}$, and in certain cases up to 5,000 $kg.m^{-3}$. A specific weight such as this is obtained by means of a press power equal to approx. 110 to 130 MPa, with an optimum of about 125 MPa, which allows a low-performance pressing apparatus to be used. If the manufacturing process requires high performance, then it is possible to use pressing by the plate holder method, on presses with a high specific press power. To increase the performance of the lines, it is inevitable to use automatic presses enabling automatic loading and unloading of the press.

The briquette-drying process is also important, and plays a decisive role in the manufacture of briquettes from slag from secondary aluminium processing.

It has already been stated that water, which is necessary for the briquetting process, in the end has a negative effect on the strength and resistance of the briquettes. During the course of 25–40 minutes after pressing, a chemical reaction takes place in the briquettes owing to the presence of $Al_xN_y$ and $H_2O$, after which the briquette loses its strength and disintegrates. Up to now, this reason contributed to the fact that slag from secondary aluminium processing could not be used in ferrous and steel metallurgy without treatment. The addition of a polymeric ingredient not only bonds together the particles of slag, but also considerably reduces the speed of the reaction, although it cannot completely halt its progress. Thus it is necessary to subject the briquettes to drying immediately after pressing. Any heating unit may be used as the drying apparatus, provided that the heat in the operating chamber may be raised to 200° C. The drying process must continue until minimal humidity is attained in the briquettes, which, at a temperature of 120–200° C., takes 30–60 minutes, depending on the weight of the briquettes.

As experiments have shown, the shape and size of the briquettes have a certain influence on their strength and length of life. The strongest and most resistant briquettes are smallish briquettes of cylindrical shape, weighing between 50 and 250 g, with advantage about 120 g.

Slag from secondary aluminium processing is a hygroscopic material, which leads to the gradual occurrence of humidity in the briquettes. This causes a reduction in the strength of the briquette and in its storage period and length of life. The briquettes gradually lose their strength, and after a certain time become unusable.

For example, in the case of briquettes of cylindrical shape with a weight of 100–150 g, this time period is 5 to 7 months. In a certain fashion, the length of life of the briquettes may be prolonged by wrapping in polyethylene, and by storage in areas with low relative humidity.

Using the method described, briquettes are obtained from the briquetting mixture with a content by weight of over 95% slag from secondary aluminium processing, up to 5% polyvinyl acetate polymer, the best up to 1.5%, and of residue humidity a maximum of 1.5% water, best no more than 0.5% water, in relation to the overall mass of the briquette, with a specific weight of 1,500 to 5,000 kg.m$^{-3}$, best around 2,000 kg.m$^{-3}$, and with a compression strength of at least 20 MPa and ideally around 100 MPa.

The quality of the final product depends not only on the basic raw materials, especially the composition and properties of the slag, the content of polyvinyl acetate dispersion, hydrophobic ingredient, if used, and water, but also on the manner in which this slag is processed, which also affects the specific weight and compression strength of the various shapes of briquette.

In its optimum composition, the briquetting mixture contains, by weight:

92% slag from secondary aluminium processing,

1% polyvinyl acetate dispersion, and

7% water.

From this composition of briquetting mixture, the process described enables briquettes to be produced with the optimum shape properties, i.e. a cylinder of diameter 35–50 mm at a height of 15–50 mm, a weight of around 120 g and a specific weight of around 2,000 kg.m$^{-3}$, with a compression strength against decomposition of around 100 MPa, a residue water content of maximally 0.5% and resistance to decomposition, after packaging, for 7 months and more.

Other possible versions of briquetting mixtures and briquettes with resistance to decomposition of 7 months and more are described below.

EXAMPLE 2

The briquetting mixture contains, by weight:

91% slag from secondary aluminium processing,

2% polyvinyl acetate dispersion, and

7% water.

Briquettes produced by the method described have a compression strength of 95 MPa, a water content of 0.6% by weight in relation to the overall weight of the briquette, and a specific weight of 2,000 kg.m$^{-3}$.

EXAMPLE 3

The briquetting mixture contains:

90% slag from secondary aluminium processing,

3% polyvinyl acetate dispersion, and

7% water.

Briquettes produced by the method described have a compression strength of 95 MPa, a water content of 0.4% by weight in relation to the overall weight of the briquette, and a specific weight of 2,100 kg.m$^{-3}$.

EXAMPLE 4

The briquetting mixture contains:

91.5% slag from secondary aluminium processing,

1% polyvinyl acetate dispersion, 0.5% hydrophobic ingredient in the form of oleic acid, and 7.0% water.

Briquettes produced by the method described have a compression strength of around 85 MPa, a water content of 0.5% by weight in relation to the overall weight of the briquette, and a specific weight of 2,100 kg.m$^{-3}$.

EXAMPLE 5

The briquetting mixture contains:

91% slag from secondary aluminium processing,

1% polyvinyl acetate dispersion,

1% hydrophobic ingredient in the form of oleic and/or stearic acid, and

7% water.

Briquettes produced by the method described have a compression strength of around 90 MPa, a water content of 0.5% in relation to the overall weight of the briquette, and a specific weight of 2,000 kg.m$^{-3}$.

EXAMPLE 6

The briquetting mixture contains:

87.5% slag from secondary aluminium processing, 8.0% polyvinyl acetate dispersion, 0.5% hydrophobic ingredient in the form of oleic and/or palmiticacid, and 4% water.

Briquettes produced by the method described have a compression strength of approx. 110 MPa, a water content of 0.5% in relation to the overall weight of the briquette, and a specific weight of 2,300 kg.m$^{-3}$.

EXAMPLE 7

The briquetting mixture contains:

95% slag from secondary aluminium processing,

2% polyvinyl acetate dispersion, 0.2% hydrophobic ingredient in the form of oleic acid, and 2.8% water.

Briquettes produced by the method described have a compression strength of around 100 MPa, a water content of 0.5% in relation to the overall weight of the briquette, and a specific weight of 2,300 kg.m$^{-3}$.

These examples of versions do not exclude other possible combinations and variations within the scope of the intention of the patent claims.

INDUSTRIAL APPLICABILITY

Besides the liquefaction of metallurgical slag, the briquettes are also suitable for the preparation of raw materials for cement manufacture, for the treatment of waste products destined for storage on dumping grounds, and for the bonding of graphite, carbonaceous and other materials.

The briquettes obtained by this technological method are intended mainly for the dilution of slags in slag runners, for the treatment of the aluminate module for slag used in cement manufacture, for the creation of synthetic slags for copper metallurgy, for the dilution of slags in arc furnaces, as a substitute for fluorite, limestone, bauxite, quartz sands etc. During usage, the briquettes also have slight desulphurising and dephosphorising properties.

What is claimed is:

1. Briquettes for the liquefaction of metallurgical slag, formed from a mixture comprising, by weight, 85–98% slag from secondary aluminium processing, 1–8% polyvinyl acetate dispersion as a polymeric bonding agent, and remainder of water; the briquettes containing water in the form of residue humidity in a quantity of up to 1.5% by weight in relation to the overall weight of the briquettes, wherein the briquettes have has a specific weight of 1,500–5,000 kg.m$^{-3}$ and a compression strength of at least 20 MPa.

2. Briquettes according to claim 1, containing residue humidity in an amount of up to 0.5% by weight in relation to the overall weight of the briquettes.

3. Briquettes according to claim 1, wherein the mixture contains, by weight, 90–92% slag from secondary aluminium processing, 1–3% polyvinyl acetate dispersion and remainder of water.

4. Briquettes according to claim 1, wherein the mixture also contains, by weight, 0.5–2% unsaturated acid, selected from the group consisting of oleic acid, palmitic acid and stearic acid, as a hydrophobic ingredient.

5. Briquettes according to claim 1, wherein said briquettes are cylindrical in shape.

6. Method of manufacture of briquettes according to claim 1, comprising the steps of mixing slag from secondary aluminium processing, polyvinyl acetate dispersion as bonding agent and water for a period of 10–60 seconds to form a homogenous mixture; pressing the homogenous mixture at a specific press power of 110 to 130 MPa to form briquettes; drying the briquettes at a temperature between 120 and 200° C. for a period of 30–60 minutes, depending on the weight of the briquettes, until the amount of residue water is reduced to a maximum value of 1.5% by weight, and after drying, cooling the hot briquettes, and wrapping the cooled briquettes for protection against humidification.

7. Method according to claim 6, including a step of preheating the mixture to a temperature of 25 to 90° C. prior to mixing the components into a homogenous state in the mixer.

8. Method according to claim 6, wherein after drying and prior to wrapping, cooling the hot briquettes to 30–50° C.

* * * * *